Patented Nov. 19, 1946

2,411,483

UNITED STATES PATENT OFFICE 2,411,483

CORROSION INHIBITION IN CATALYTIC HYDROCARBON CONVERSION

Aaron Wachter, Berkeley, and Richard S. Treseder, San Francisco, Calif., assignors to Shell Development Company, San Francisco, Calif., a corporation of Delaware No Drawing. Application August 28, 1943, Serial No. 500,458

15 Claims. (Cl. 260—666)

This invention relates to the execution of catalytic reactions with the aid of Friedel-Crafts type catalysts and relates more particularly to the catalytic conversion of hydrocarbons with the aid of catalysts comprising an organo-metal halide complex.

In the execution of catalytic conversions on a practical scale with the aid of Fridel-Crafts type catalysts it is often desirable, and sometimes imperative, that the catalysts employed be of the type comprising the metal halide in the form of an organic complex, because of physical and chemical characteristics peculiar to these compounds. Catalysts comprising such an organo-metal halide complex generally consist of a liquid or sludge obtained by mixing a metal halide with an organic compound under suitable conditions, resulting in the interaction of the halide with the organic compound and/or decomposition products thereof. The metal halide constituent of the organic complex may comprise a halide such as the chloride, bromide or fluoride of such metals as, for example, Al, B, Ga, In, Te, Be, Mg, B, Cd, Cu, Co, Zr. Of these metal halides the halides of aluminum, particularly aluminum chloride and aluminum bromide, are preferred. Suitable organic compounds with which the metal halides are combined under conditions resulting in the obtaining of the desired organo-metal halide complex comprise, for example, aromatic hydrocarbons, such as benzene and toluene; hydrocarbon fractions such as kerosene extracts; cyclic olefins such as cyclohexene, cyclopentene and alkyl derivatives thereof; paraffinic and olefinic hydrocarbons of straight or branched chain structure; phenols; organic acids, ethers, etc. In the preparation of the complex catalysts the organic compound and metal halide are subjected to an elevated temperature, for example, not substantially in excess of about 150° C., generally in the presence of an added hydrogen halide, for a sufficient length of time to result in the formation of a liquid, or sludge, consisting essentially of an organo-metal halide complex. It is to be pointed out, however, that the present invention is in no wise limited by the method of production of the organo-metal halide catalysts.

The catalyst is generally employed in the presence of an added hydrogen halide promoter, such as, for example, hydrogen chloride, hydrogen bromide, hydrogen fluoride, alkyl halides or materials capable of producing any of these halide promoters under the conditions of the execution of the reaction. The complex may, furthermore, comprise suspended metal halides remaining in the product obtained in the preparation of the catalyst or added subsequent to the preparation of the catalyst.

The organo-metal halide complex catalysts, for example those comprising an aluminum halide-hydrocarbon complex, are utilized with advantage as catalysts in the execution of catalytic hydrocarbon conversion processes, such as, for example, those involving isomerization, alkylation, reforming, cracking, and polymerization reactions. Other processes in which they can be applied comprise the refining or treatment of hydrocarbons comprising, for example, normally gaseous hydrocarbons, normally liquid hydrocarbons in the motor fuel boiling range, recycle stocks, lubricating oils, etc.

A difficulty encountered in the utilization of the organo-aluminum halide complex catalysts, often seriously detracting from the advantages otherwise inherent in their use on a practical scale, is their corrosive nature. They are particularly corrosive to steel and iron- or ferrous metal-containing materials of which the apparatus in which the processes are conducted must generally be manufactured. Such corrosive effect, it must be pointed out, not only results in rapid deterioration of costly apparatus, but in a rapid decline in the useful life of the organo-metal halide complex catalyst, thereby further increasing the cost of the operation. Though it is not intended to limit the invention by any theories advanced herein to set forth more clearly the nature of the invention, it is believed that such increased rate in the decrease of the catalyst life is often due, at least in part, to the rapid increase of iron in the catalyst as a result of the latter's corrosive effect upon the ferrous metal-containing surfaces in contact therewith. The effect of a relatively high concentration of iron on the life of these catalysts is illustrated by the following example.

*Example I*

A dimethylcyclopentane-containing fraction of straight run gasoline having a boiling range of from 85° C. to 98° C. was treated with a catalyst consisting of an $AlCl_3$-toluene complex under the following conditions:

Temperature: 80° C.
Contact time: 17 minutes
Catalyst to hydrocarbon ratio=1:3

Hydrogen chloride in the amount of 0.1% by weight was added to the charge. The operation was discontinued when the catalyst activity had dropped to 50% of the equilibrium conversion of dimethylcyclopentane to methylcyclohexane.

Under these conditions 106 gallons of the hydrocarbon charge were treated per pound of AlCl₃ in the catalyst. In a second operation a separate portion of the same feed was treated under identical operating conditions with a separate portion of the same catalyst in which iron in an amount of 6% by weight of the catalyst had been dissolved. The amount of hydrocarbon charge treated per pound of AlCl₃ in the catalyst in the second operation amounted to only 78 gallons.

Certain metals, for example nickel, and alloys are available which are not so readily corroded by the complex catalyst as the ferrous metal-containing materials. The cost of these materials, however, generally prohibits their use in practical installations, and even though attacked to a lesser degree by the complexes than ferrous metals they are nevertheless seriously corroded over prolonged periods of contact with these catalysts. Resort to expedients such as the coating of the metal surfaces in contact with the catalyst is generally found to be impractical and costly. Many of the available coating materials, such as, for example, plastics, are often found to deteriorate and crack after relatively short time of use, thereby entailing additional costs, as well as a serious loss of time required to effect necessary repairs.

It has now been found that the serious difficulties heretofore encountered in the utilization of organo-metal halide complex catalysts can be substantially completely obviated by maintaining in the catalyst small amounts of a corrosion inhibitor selected from the metals of groups IV and V of the periodic table. By the term "metals" as used throughout the specification and appended claims it is intended to include the elements arsenic and antimony.

The organo-metal halide complex catalysts comprising at least one of these metals are surprisingly devoid of any substantial corrosive action upon most metal surfaces, and particularly upon ferrous metal-containing surfaces, in contact therewith. Some of the inhibitor metals are more efficient in their corrosion inhibiting effect than others, their comparative efficiency in this regard being, to some extent, determined by the particular operating conditions used, the composition of the particular catalyst employed, and the composition of the metal surface in contact with the catalyst. The presence of arsenic in even as small an amount as 0.05% by weight of the catalyst is sufficient to substantially suppress corrosion of steel in contact therewith. Antimony effects substantial suppression of corrosion of a steel surface in contact with the catalyst when present in an amount below about 0.1% by weight of the catalyst. It is therefore apparent that the exact amount of the particular inhibitor required to obtain substantially complete inhibition of corrosion will vary somewhat with the particular metal used. The concentration of the inhibitor metal in the organo-metal halide complex catalyst is generally maintained in the range of from about 0.01% to about 7%, and preferably from about 0.05% to about 3%, by weight of the catalyst. Lesser or greater concentrations may however be used within the scope of the invention.

Of the metals of groups IV and V suitable as corrosion inhibitors, antimony, arsenic and titanium are preferred. The inhibitor metals need not necessarily be introduced into the catalyst in the uncombined or metallic form but may be employed in the form of a suitable compound. Though ability of the compound to dissolve in the orango-metal halide complex is not essential to the attainment of the corrosion inhibiting effect, those capable of solution in the catalyst sludge are nevertheless somewhat preferred. Suitable compounds of the inhibitor metals comprise their halide salts, such as the chlorides, bromides and fluorides; their oxides; salts of organic acids, and oxygen-containing mineral acids; etc. When adding the metal inhibitor in the form of its halide salt it is not necessary that the halide correspond to that of the metal halide constituent of the organo-metal halide sludge. For example, when utilizing a hydrocarbon-aluminum chloride complex catalyst the inhibitor metal can be added in the form of the chloride, bromide, fluoride, a salt comprising more than one type of halide atom, or it may be added as a mixture of any two or more of such halide salts. Compounds of the inhibitor metals, the addition of which has proven to be particularly effective in suppressing the corrosive activity of the organo-metal halide complex catalysts, comprise compounds containing the metals of group IV in their tetravalent form and those of group V in the trivalent form, for example SbCl₃, As₂O₃, AsCl₃, TiCl₄. When the inhibitor metal is thus added in combined form, a sufficient amount of the compound containing it is added to the catalyst to provide a concentration of the inhibitor metal therein within the above-defined range. The presence of SbCl₃ in the complex catalysts in concentrations of from about 0.02% to about 14%, and preferably from about 0.1% to about 6%, have been found highly satisfactory.

Although it is generally sufficient to effect the addition of but one of the inhibitor metals to the complex, more than one of these metals may be added to obtain a catalyst devoid of any substantial corrosive effect. The inhibitor metal, or compound comprising it, may also be employed in the form of an admixture or even chemical combination with organic compounds. Thus, inhibitor metal-containing sludge recovered from one operation wherein the inhibitor metal was employed as corrosion inhibitor and/or catalyst component, may be added to the charge of the same or an entirely separate process. For example, an SbCl₃-containing sludge, obtained in the isomerization of paraffinic hydrocarbons, in the alkylation of isoparaffins with olefins, or similar operations, with the aid of metal halide-containing catalysts may be introduced into the charge to a naphthene isomerization process to attain the desired corrosion inhibition.

The following example is given to illustrate the absence to a surprising degree of any substantial corrosive action upon metal surfaces by the organo-aluminum halide complex catalysts containing a metal of groups IV and V of the periodic table; it is to be understood, however, that the values given are illustrative rather than limiting.

Example II

In a series of tests, polished metal surfaces of low carbon steel and 5% nickel steel were brought into intimate contact with AlCl₃-hydrocarbon complex catalysts at temperatures and for time intervals indicated in the table below. The liquid catalyst was agitated by bubbling dry HCl through it. The catalysts used were: an AlCl₃-toluene complex prepared with chemically pure aluminum chloride, identified in the following table by the letter "A"; an AlCl₃-toluene complex, prepared with an AlCl₃ of a technical grade of purity, identified in the table by the letter "B"; and an AlCl₃-hydrocarbon complex prepared by the interaction of chemically pure aluminum chloride and a smokeless kerosene extract, identified in the table by the letter "C." In a series of separate tests similar metal surfaces were contacted under substantially identical conditions with separate portions of the same catalysts to which the indicated metals of groups IV and V in the amount and form given in the table below were added. Separate runs were also made wherein similar metal surfaces were subjected under substantially identical conditions to contact with separate portions of the indicated catalyst to which Fe and PCl₃ were added in the amounts shown. The corrosion rates of the metal surfaces were carefully determined and are given in the following table for each of the individual tests in mils per year.

| Catalyst | Inhibitor per cent of cat. by wt. | Temp., °C. | Contact time, hrs. | Corrosion rate mils per year | |
|---|---|---|---|---|---|
| | | | | Low carbon steel | 5% Ni steel |
| P-196 A | None | 80 | 0-20 | 3,530 | 1,660 |
| P-201 A | 0.2% SbCl₃ | 80 | 0-24 | 7 | 6 |
| | | 80 | 24-89 | 6 | 11 |
| P-205 A | 0.4% SbCl₃ | 80 | 0-21 | 6 | 13 |
| | | 80 | 21-88 | 9 | 18 |
| P-199 A | 4% SbCl₃ | 80 | 0-23 | 6 | 5 |
| | | 80 | 23-47 | 8 | 8 |
| P-228 B | None | 80 | 0-25 | 5,600 | |
| P-233 B | 1% TiCl₄ | 80 | 0-24 | 35 | |
| | | 80 | 24-89 | 25 | |
| P-247 B | 0.1% As₂O₃ | 80 | 0-24 | 11 | |
| | | 80 | 24-87 | 4 | |
| P-251 B | 0.3% As₂O₃ | 80 | 0-137 | 0.6 | |
| P-259 B | 0.3% As₂O₃ | 100 | 0-24 | 24 | |
| P-237 B | 1% AsCl₃ | 80 | 0-24 | 1 | |
| | | 80 | 24-136 | 3 | |
| P-198 C | None | 80 | 0-23 | 2,140 | |
| P-260 C | 0.3% As₂O₃ | 100 | 0-24 | 2 | |
| | 0.3% As₂O₃ | 100 | 0-24 | 2 | |
| P-262 A | 1% Fe (as Fe₂O₃) | 80 | 0-24 | 2,250 | |
| P-263 A | 1% Fe (filings) | 80 | 0-24 | 1,500 | |
| P-234 B | 1% PCl₃ | 80 | 0-24 | 2,630 | |

As shown by the foregoing example, corrosion of ferrous metal-containing surfaces in contact with an organo-metal halide complex is obviated substantially completely and considerable saving, as represented by increase in the life of equipment, is realized by the inclusion of only relatively small amounts of a metal of group IV or V in the catalyst. It is, furthermore, seen from the above example that the ability to effect the suppression of the corrosive effect of the catalyst is not possessed by the purely non-metal phosphorus, or by small amounts of iron. That the ability to effect the suppression of corrosion by sludge-type catalysts is not possessed by all metals was further indicated in tests wherein small amounts of nickel and copper were added to catalysts of this type without the attainment of any decrease in corrosiveness and resulting detrimental consequences.

The inhibitor metal in uncombined or combined form may be introduced into the catalyst in any suitable manner. It may be introduced into the catalyst in the form of solid pieces; a powder; as a slurry or a suspension in a suitable liquid medium, such as, for example, a suspension in a hydrocarbon or a hydrocarbon fraction; as a solution in a suitable solvent, for example, an acid, such as a hydrogen halide; etc. The inhibitor metal may be introduced into the catalyst before contact therewith of the material to be treated; or it may be introduced in part or in its entirety into the charge or directly into the reaction zone during the course of operation. It is to be pointed out that it is essential to the attainment of substantial or complete suppression of corrosion that the presence of the inhibitor in the catalyst, preferably within the prescribed concentration, be maintained throughout the operation during which the catalyst is used. Subjection of the metal surface to the catalyst containing the inhibitor or treatment of the metal surface with the inhibitor metal in the form of a suitable compound, such as, for example, antimony trichloride, does not render such a surface immune to subsequent corrosion by the catalyst in the absence of one of the inhibitor metals. This is illustrated by the following examples.

*Example III*

Three polished specimens of low carbon steel were immersed for 15 minutes in a catalyst consisting of an AlCl₃-toluene complex containing 0.4% SbCl₃ by weight of the catalyst. The specimens were then contacted for a period of 24 hours with a portion of the identical catalyst to which no SbCl₃ had been added. The catalyst in both instances was maintained at a temperature of 80° C. and agitated by bubbling dry hydrogen chloride gas through it. The rate of corrosion in mils per year was found to average 2160.

*Example IV*

Three polished specimens of low carbon steel were immersed for 1 hour in an AlCl₃-toluene complex to which 0.3% of As₂O₃ had been added. The specimens were then immersed for 24 hours in a separate portion of the identical complex catalyst containing no As₂O₃. The catalyst in both instances was maintained at 80° C. and agitated by bubbling dry hydrogen chloride through it. The average rate of corrosion in mils per year was found to be 1870.

Often, depending upon the particular material being treated with the organo-metal halide complex catalyst containing a metal inhibitor, a certain amount of the inhibitor will be removed from the catalyst body in the reaction zone by entrainment and/or solution in the reaction product. This will be the case in processes wherein hydrocarbons constitute the material undergoing treatment. The inhibitor metals, though added in metallic or other form, are generally converted to the halides in the presence of the catalyst, particularly when a hydrogen halide promoter is present. These halides are soluble to a certain degree in hydrocarbons and will be extracted from the catalyst in the reaction zone as the process proceeds. The inhibitor metal is, therefore preferably initially added to the catalyst in sufficient amount to assure a corrosion inhibiting concentration therein and additional amounts added continuously or intermittently to the feed entering the reaction zone during the course of execution of the process to assure the maintenance at all times of a corrosion inhibiting concentration of the metal in the catalyst. A particularly advantageous method of operation comprises the addition of the inhibitor to but a portion of the hydrocarbon charge and thereafter combining the inhibitor-containing portion of the feed with the rest of the hydrocarbon feed entering the reaction zone. Such method of operation wherein but a portion of the charge passes through a suitable inhibitor-adding zone greatly facilitates maintenance of the inhibiting amount of the inhibitor within the reaction zone. It further enables separate heating of the main portion of the charge to a temperature sufficiently high to maintain the desired reaction conditions and the lesser portion to a temperature most favorable to solution of the desired quantity of inhibitor therein.

Since only relatively low concentrations of the inhibitor metals are generally required to obtain the inhibition of corrosion, the concentration of the metal in the reaction product will generally be so small that its removal therefrom will not be required. Separation of the inhibitor metal or a compound containing it from the reaction product may, however, be effected by any suitable means comprising, for example, one or more of such steps as water-washing, washing with alkaline solutions such as aqueous sodium hydroxide, distillation, fractionation, scrubbing, solvent extraction, treatment with solid adsorptive materials, etc. In the processing of hydrocarbons with the organo-metal halide complex catalysts in the presence of one of the metal inhibitors, for example arsenic, antimony or compounds thereof, it has been found that the inhibitor or compounds containing it, such as the halides, can readily be removed from the reaction product by the addition thereto of small amounts of water which cause the inhibitor to settle out as a hydrolysis product. The inhibitor thus separated may be returned to the catalyst in the reaction zone, preferably after undergoing a dehydration treatment and optionally its conversion to a more suitable form, such as the metallic form or a halide salt.

A particular advantage in the utilization of an inhibitor metal, such as antimony or its compounds, for example, antimony trichloride, resides in the ability to separate any antimony trichloride in the reaction product by simple fractionation. Thus, in the treatment of hydrocarbons the antimony trichloride may be separated as a separate fraction containing the antimony trichloride above its melting point. The thus recovered antimony trichloride may be returned to the reaction zone without the need for further treatment of the recovered inhibitor prior to recycling it.

An essential characteristic of a suitable corrosion inhibitor must be the absence of any substantial adverse effect upon the activity of the catalyst. In this respect the metals of groups IV and V possess the advantage of having no harmful effect upon either the activity or the useful life of the organo-metal halide complex catalysts. Certain of the metal inhibitors, particularly arsenic, antimony and titanium and compounds containing them, particularly the halides, often are found to exert not only a promoting effect depending upon the particular composition of the catalyst and operating conditions used, but also to increase the useful life of the catalyst. The highly advantageous effect upon catalytic activity and useful catalyst life by inclusion of these corrosion inhibitor metals in the organo-aluminum halide complex catalysts is shown in the following examples.

*Example V*

A naphthenic straight run dimethylcyclopentane-containing fraction boiling in the range of 85° C. to 98° C. was treated with a catalyst consisting of an AlCl₃-toluene complex under the following conditions:

Temperature: 80° C.
Contact time: 17 minutes
Catalyst to hydrocarbon ratio=1:3

Hydrogen chloride in the amount of 0.1% by weight was added to the feed. The operation was terminated when the activity of the catalyst had declined to a point where the conversion of dimethylcyclopentane to methylcyclohexane had dropped to 50% of equilibrium conversion. Under these conditions 36 gallons of hydrocarbon feed was treated per pound of AlCl₃ in the catalyst. The operation was repeated with separate portions of the same catalyst and feed under identical conditions with the exception that 0.8% by weight of As₂O₃ was added to the catalyst. The amount of hydrocarbon feed treated per pound of AlCl₃ in the catalyst was increased to 42 gallons.

*Example VI*

A portion of the same feed utilized in the operation of Example V was treated under the conditions set forth in Example V with an AlCl₃-toluene complex catalyst of different origin. 47 gallons of the hydrocarbon feed were treated per pound of AlCl₃ in the catalyst. Treatment of a separate portion of the same feed under identical conditions as the foregoing operation but with the exception that 1.6% by weight of As₂O₃ was added to the catalyst resulted in an increase in the amount of hydrocarbon feed treated to 51 gallons.

*Example VII*

A dimethylcyclopentane-containing hydrocarbon fraction having a boiling range of from 85° C. to 95° C. was treated in continuous operation at a temperature of from 80° C. to 100° C. with an AlCl₃-hydrocarbon complex obtained by the interaction of AlCl₃ and a kerosene extract to convert the dimethylcyclopentane content of the feed to methylcyclopentane. The maximum amount of feed treated per pound of catalyst, in repeated operations, amounted to 110 gallons. The operations were repeated with substantially identical feed, catalyst and operating conditions with the exception that SbCl₃ in the amount of 0.2% by weight of the catalyst was initially added to the catalyst sludge and additional SbCl₃ was continuously added to the hydrocarbon feed to maintain a concentration of 0.01% of SbCl₃ in the hydrocarbon feed entering the reaction zone. Under these conditions the treatment of 150 to 200 gallons of feed per pound of catalyst as determined by substantially identical conversions of dimethylcyclopentane to methylcyclohexane were obtained.

The invention therefore provides a highly efficient method for the elimination of the severe difficulties heretofore encountered in the use of metal halide catalysts as a result of the corrosive action of these catalysts upon metal surfaces in contact therewith, thereby enabling the attainment not only of a substantial increase in the life of the equipment and the useful life of the catalyst but the substantial savings and reduction in cost of operation occurring therefrom.

We claim as our invention:
1. In the execution of catalytic reactions wherein reactants are contacted with a catalyst consisting of a preformed organo-metal halide complex catalyst in a reaction zone comprising a metal-containing surface in direct contact with said catalyst, the method of inhibiting corrosion of said metal-containing surface and increasing the useful life of said catalyst which comprises maintaining in said catalyst a corrosion inhibiting amount of a member of the group consisting of antimony and antimony halides in which all halide atoms are the same.

2. In a catalytic hydrocarbon conversion process wherein hydrocarbons are converted in the presence of a catalyst consisting of a preformed organo-aluminum halide complex in a reaction zone comprising a metal-containing surface in direct contact with said catalyst, the method of inhibiting corrosion of said metal surface and increasing the useful life of said catalyst which comprises maintaining in said catalyst a corrosion inhibiting amount of antimony.

3. In the execution of catalytic reactions wherein reactants are contacted with a catalyst consisting of a preformed metal halide-hydrocarbon complex in a reaction zone comprising a metal-containing surface in direct contact with said catalyst, the method of inhibiting corrosion of said metal-containing surface and increasing the useful life of said catalyst which comprises maintaining in said catalyst a corrosion inhibiting amount of an antimony trihalide in which all three halide atoms are the same.

4. In a catalytic hydrocarbon conversion process wherein hydrocarbons are converted in the presence of a catalyst consisting of a preformed organo-metal halide complex in a reaction zone comprising a metal-containing surface in direct contact with said catalyst, the method of inhibiting corrosion of said metal surface and increasing the useful life of said catalyst which comprises maintaining in said catalyst a corrosion inhibiting amount of an antimony trihalide in which all three halide atoms are the same.

5. In a catalytic hydrocarbon conversion process wherein hydrocarbons are converted in the presence of a catalyst consisting of a preformed aluminum halide-hydrocarbon complex in a reaction zone comprising a metal-containing surface in direct contact with said catalyst, the method of inhibiting corrosion of said metal-containing surface and increasing the useful life of said catalyst which comprises maintaining in said catalyst a corrosion inhibiting amount of antimony trichloride.

6. In the execution of catalytic reactions wherein reactants are contacted with a catalyst consisting of a preformed aluminum chloride-hydrocarbon complex in a reaction zone comprising a metal-containing surface in direct contact with said catalyst, the method of inhibiting corrosion of said metal-containing surface and increasing the useful life of said catalyst which comprises maintaining in said catalyst from about 0.1% to about 6% by weight of antimony trichloride.

7. In a catalytic hydrocarbon conversion process wherein hydrocarbons are converted in the presence of a catalyst consisting of a preformed aluminum halide-hydrocarbon complex in a reaction zone comprising a metal-containing surface in direct contact with said catalyst, the method of inhibiting corrosion of said metal-containing surface and increasing the useful life of said catalyst which comprises maintaining in said catalyst from about 0.01% to about 7% by weight of antimony.

8. In a catalytic hydrocarbon conversion process wherein hydrocarbons are converted in the presence of a catalyst consisting of a preformed aluminum chloride-hydrocarbon complex in a reaction zone comprising a metal-containing surface in direct contact with said catalyst, the method of inhibiting corrosion of said metal-containing surface and increasing the useful life of said catalyst which comprises maintaining in said catalyst from about 0.05% to about 3% by weight of an antimony trihalide in which all three halide atoms are the same.

9. In a catalytic hydrocarbon conversion process wherein hydrocarbons are converted in the presence of a catalyst consisting of a preformed aluminum chloride-hydrocarbon complex in a reaction zone comprising a metal-containing surface in direct contact with said catalyst, the method of inhibiting corrosion of said metal surface and increasing the useful life of said catalyst which comprises maintaining in said catalyst from about 0.1% to about 6% by weight of antimony trichloride.

10. A non-corrosive aluminum halide-hydrocarbon complex catalyst consisting of a preformed aluminum halide-hydrocarbon complex containing a corrosion inhibiting amount of antimony trihalide in which all three halide atoms are the same.

11. A non-corrosive aluminum chloride-hydrocarbon complex catalyst consisting of a preformed aluminum chloride-hydrocarbon complex containing a corrosion inhibiting amount of $SbCl_3$.

12. A non-corrosive aluminum chloride-hydrocarbon complex catalyst consisting of a preformed aluminum chloride-hydrocarbon complex containing from about 0.1% to about 6% by weight of $SbCl_3$.

13. In a catalytic hydrocarbon conversion process wherein hydrocarbons are contacted under conversion conditions with a catalyst consisting of a preformed organo-metal halide complex in a reaction zone comprising a metal-containing surface in direct contact with said catalyst, the method of inhibiting corrosion of said metal surface and increasing the useful life of said catalyst which comprises adding antimony to said hydrocarbons prior to contact with said catalyst in controlled amounts to maintain a concentration of from about 0.01% to about 7% by weight of said metal in said catalyst.

14. In a catalytic hydrocarbon conversion process wherein hydrocarbons are contacted under conversion conditions with a catalyst consisting of a preformed organo-metal halide complex in a reaction zone comprising a metal-containing surface in direct contact with said catalyst, the method of inhibiting corrosion of said metal surface and increasing the useful life of said catalyst which comprises adding to said hydrocarbons a member of the group consisting of antimony and antimony halides in which all halide atoms are the same prior to contact with said catalyst.

15. In a catalytic hydrocarbon conversion process wherein hydrocarbons are contacted under conversion conditions with a catalyst consisting of a preformed organo-metal halide complex in a reaction zone comprising a metal-containing surface in direct contact with said catalyst, the method of inhibiting corrosion of said metal surface and increasing the useful life of said catalyst which comprises continuously adding $SbCl_3$ to said hydrocarbons prior to contact with said catalyst in controlled amounts to maintain a concentration of from about 0.1% to about 6% $SbCl_3$ in said catalyst.

AARON WACHTER.
RICHARD S. TRESEDER.